United States Patent [19]
Heisel et al.

[11] Patent Number: 6,039,096
[45] Date of Patent: Mar. 21, 2000

[54] MILLING TOOL WITH REDUCED NOISE EMISSION FOR MACHINING WOOD OR THE LIKE

[76] Inventors: Uwe Heisel, Robert-Haug-Weg 18, D-70194 Stuttgart; Johannes Tröger, Rilkestrasse 6, D-71229 Leonberg, both of Germany

[21] Appl. No.: 09/125,865
[22] PCT Filed: Feb. 24, 1997
[86] PCT No.: PCT/EP97/00872
  § 371 Date: Aug. 27, 1998
  § 102(e) Date: Aug. 27, 1998
[87] PCT Pub. No.: WO97/31762
  PCT Pub. Date: Sep. 4, 1997

[30] Foreign Application Priority Data

Feb. 27, 1996 [DE] Germany .......................... 196 07 318

[51] Int. Cl.[7] .............. B27G 13/04; B27L 11/02
[52] U.S. Cl. .............. 144/235; 144/218; 144/229; 144/39; 407/38; 407/48; 407/49
[58] Field of Search ............... 144/36, 37, 38, 144/162.1, 176, 218, 220, 223, 235, 241; 407/29, 31, 38, 41, 48, 58

[56] References Cited

U.S. PATENT DOCUMENTS

| | | |
|---|---|---|
| 1,472,960 | 11/1923 | Conklin ................................ 144/235 |
| 2,781,068 | 2/1957 | Anderson . |
| 3,163,919 | 1/1965 | Turner . |
| 4,147,193 | 4/1979 | Kivimaa .................................. 144/220 |
| 4,263,949 | 4/1981 | Kivimaa . |
| 4,266,584 | 5/1981 | Lomnicki .............................. 144/220 |
| 4,309,132 | 1/1982 | Adamson et al. . |
| 4,632,162 | 12/1986 | Angeloni . |
| 5,617,908 | 4/1997 | Toogood ................................. 144/39 |
| 5,782,278 | 7/1998 | Larsson ................................ 144/220 |

FOREIGN PATENT DOCUMENTS

| | | |
|---|---|---|
| 2 648 385 | 12/1990 | France . |
| 2 716 830 | 9/1995 | France . |
| 183159 | 4/1907 | Germany . |
| 3924714A1 | 2/1990 | Germany . |
| 19607318A1 | 9/1997 | Germany . |
| 963192 | 7/1964 | United Kingdom . |

OTHER PUBLICATIONS

Felder, Werkzeuge, 1993 (brochure).

*Primary Examiner*—W. Donald Bray
*Attorney, Agent, or Firm*—Jones, Tullar & Cooper, P.C.

[57] ABSTRACT

The invention concerns a milling tool (10) with reduced noise emission for machining panel-like pieces of wood. The reduction in noise emission is brought about by reducing the vibrations produced in the tool and workpiece and by proportioning the cut, machining being carried out in two stages. The greatest part of the chip volume (first stage) is removed under favorable noise-emission conditions using a special cutting geometry. The tool and workpiece vibrations are reduced by a clearly reduced rise in the shear force pulse using a special cutting tooth geometry. The chip volume removed under these conditions is only small (second stage), and so good quality machining can be attained.

16 Claims, 7 Drawing Sheets

MILLING TOOL WITH REDUCED NOISE EMISSION FOR MACHINING WOOD OR THE LIKE

FIELD OF THE INVENTION

The present invention relates to a milling tool for working wood or similar easily machined materials.

BACKGROUND

In this connection, "materials similar to wood which are easily machined" is understood to mean, for example, other wood materials, plastic materials or materials agglomerated therefrom. Such a milling tool is in particular intended to be used for processing, for example trimming plate-shaped components made of materials like that.

Manufacturers of woodworking machines have been trying for decades to reduce the level of sound output radiated by the machines, or respectively to keep it within bearable approved limits. Although the mechanism of sound generation can be considered to be scientifically understood (Tröger, J.: "Über den Mechanismus der Schallentstehung beim Spanen" [On the Mechanism of Sound Generation During Machining]—1st Report: "Untersuchung über den Arbeitslärm" [Studies Regarding Workplace Noise], Holztechnology [Wood Technology] Leipzig 10 (1969) 3, pp. 181 to 184;—2nd Report: "Untersuchungen über den Leerlaufärm" [Studies of Noise When Running Idle], Wood Technology 10 (1969) 4, pp. 265 to 269;—3rd Report: "Theoretische Untersuchungen" [Theoretical Studies] Part I, Wood Technology Leipzig 11 (1970) 1, pp. 41 to 47; 4th Report: "Theoretische Untersuchungen" [Theoretical Studies] Part II, Wood Technology Leipzig 11 (1970) 2, pp. 75 to 80), there has been no success in completely meeting the prescribed legal requirements in connection with trimming work. The introduction of diamonds as the cutting material in circular sawing tools and compact cutting tools, which has occurred in recent years, required increased wedge angles, because of which the specific cutting force increased approximately tenfold. With this, the emitted sound output level also increased, since there are significant connections between the cutting force and noise emission. Machines for trimming to shape in the furniture industry are particularly affected, of which in Germany alone there are approximately 500 machines combined into installations. For this reason there exists a need for action with the goal of clearly reducing the presently too high noise levels of approximately 90 to 95 dB AI and more at the respective work stations. New basic solutions for reducing the emitted sound output must be sought, based on the known mechanisms of sound generation. Besides a reduced noise emission, the tools with these special cutting geometry also must assure excellent processing qualities. As the latest publications in the trade journals show, the demands for high-grade processing quality of the products of the wood processing and wood-working industry are still quite topical.

Sound sources in the course of processing wood are the tool and the workpiece. Both the noise while idling as well as the noise being emitted when machining (work noise) can be determining. The main sound source during idling is the tool. The aerodynamic eddy noise is created by air vortices being alternatingly released at the sides of the cutting edges. This noise is characterized by a broad band roar without distinguished tonal components. If there is a sharp-edged obstacle in the vicinity of the vortex field, the so-called "sound of rotation" appears, which has a distinguished tonal component, whose frequency equals the product of the number of cutting edges and the rpm. The increase in the sound output level with the reduction of the distance from the cutting edge can be up to 10 dB. In connection with the interpretation of the work noise it must be assumed that the tool and the workpiece are structures which are capable of mechanical oscillations. Their excitation during the milling process is caused by a portion of the milling force. It is not possible to precalculate the size of the excitation force, in accordance with the above mentioned scientific studies it is proportional to the cutting force. In the same way it is not possible to exactly define the workpiece as a mechanical oscillator.

The cutting force consists of a frictional portion, which is constant during the operation, and a portion which is proportional to the instantaneous depth of cut. Since the depth of cut increases (opposed running) or decreases (ganging) linearly over time, this portion is triangular, the frictional force portion is constant (rectangular) during the operation. An oscillation excitation of the tool and the workpiece takes place both at the front of the cutting operation as well as at the end of the contact of the cutting edge with the workpiece, i.e. respectively at the time at which the greatest discontinuity of the excitation force is present.

In actuality, the problems in connection with trimming are caused less by the idling noise than by the work noise. The radiated acoustic output ($P_{ak}$) is proportional to the sound-radiating surface (A), the square of the effective value of the oscillation velocity ($v_{eff}$), the air density (p), the speed of sound (c) and the degree of radiation ($\sigma$):

$$P_{ak} = \sigma \cdot p \cdot c \cdot v_{eff}^2 \cdot A \tag{1}$$

The higher the effective value of the oscillation velocity, the greater the emitted sound output level, and vice versa. Even if it would be possible to exactly calculate the effective value of the oscillation velocity, there are considerable problems in connection with the determination of the degree of radiation ($\sigma$) and the radiating surface (A). A precalculation of the radiated acoustic output ($P_{ak}$) of a particular system capable of oscillating is extremely difficult, if possible at all. In spite of these problems it was possible to qualitatively prove the effects of the technical milling actuating variables of the milling operation on the sound emission. By means of a model-like reproduction of the milling and oscillating process it was possible to prove a good agreement with reality. The simulation of the oscillating processes during milling took place in the above mentioned scientific studies by means of a passive analog computer, in which all parameters of interest, such as the type and number of the supports, damping, density, modulus of elasticity, spring constants and forces (frequency, length of time, shape of the pulse, pulse duty factor) were simulated. All technical milling actuating variables which, in the simulation of the cutting force resulted in an increase of the effective value of the oscillation velocity of the model, also caused an increase of the sound level. In this way it was possible, for example, to prove the effects of the rate of chip removal both in connection with the velocity level of the model as well as with the actual sound output level with a log. graduation of the abscissa to be a linear connection. Here the oscillation velocity during simulation of the opposed running is considerably less at the start of the cutting force impulse (small rise of dF/dt) than at the sudden exit of the cutting edge from the workpiece (large rise of dF/dt). In 1971 the claim was formulated in the above mentioned scientific studies that by reducing the unsteadiness of the chronological progression of the milling force it would be possible to reduce the oscillation velocity and therefore the noise emission. Niemeyer, W.-H. in: "Primäre Linderungsmasnahme in der Holzbearbeitung: Fräswerkzeuge" [Primary Reduction Step in Woodworking: Milling Tools], Industrie-Anzeiger [Industrial Gazette] 110 (1988), No. 23, pp. 40 and 41, confirmed this realization in 1988 by his studies. The size of the exciting force is not decisive, but its unsteadiness is. The exciting force of the system of tool/workpiece capable of oscillations is proportional to the portion of the milling force which acts in the direction, or respectively directions, in which the particular system can oscillate. The calculation of the excitation force for a particular case is difficult, since only a few studies regarding the size and direction of the milling force are available. Additional scientific realizations are available from Heisel, U., Tröger, J., Dietz, H.: "Am Schneidkeil wirkende Kräfte" [Forces Acting on the Cutting Wedge], Part (1), Holz- und Kunststoffbearbeitung [Wood and Plastic Material Processing], HK (1995) 6, pp. 884 to 888; Part (3) Holz- und Kunststoffbearbeitung [Wood and Plastic Material Processing], HK (1995) 7, pp. 1000 to 1004. For simulating the system, the cutting force was selected as the excitation force and it was possible to interpret the qualitative connections quite well by means of this, so that the behavior of the excitation force can be explained with the aid of the cutting force. A force resulting from the milling process only acts if a cutting tooth is in engagement.

A tooth of a circular saw which, for example, operates in the opposed direction, does not encounter the workpiece with its cutting edge, but suddenly with its breast (cutting surface). It is understood that at the moment of the impact of the cutting surface of the cutting wedge there is no ideal cutting process. The increase of cutting force of an opposite running circular saw takes place over a length of time during which the tool (for example for a tooth advance $F_z=0.5$ mm) turns around an angle of rotation of approximately $\phi=0.2°$. This corresponds to a time of approximately $5 \times 10^6$ s. In ganging, which is mainly used in trimming, the cutting edge impacts directly on the surface of the workpiece. In this case the increase is even greater, the cutting force here acts immediately for all practical purposes. It is necessary to drastically reduce the increase of the cutting force-time function for achieving a noise reduction.

SUMMARY OF THE INVENTION

It is therefore an object of the present invention to create a milling tool for working wood or similar easily cut materials of the type described at the outset, by means of which a reduction in the sound emission can be achieved in a structurally simple manner.

To attain this object, in connection with a milling tool for working wood or similar easily cut materials of the type described at the outset the rotary surfaces of the minor cutting edges of both rows of teeth make a transition into each other, and the combined rotary surface forms setting angles which are reduced continuously or in sections from radially outward to radially inward with respect to the working level, which extends perpendicularly to the axis of rotation.

By means of the measures in accordance with the present invention, a reduction of the noise emission is achieved both by a reduction of the oscillation excitation of the tool and the workpiece as well as by a differentiated cutting division. The reduction of oscillations of the tool and the workpiece is caused by a clearly reduced increase of the cutting impulse by means of a special cutting tooth geometry.

The angled course of the minor cutting edges can take place by means of the exemplary embodiment where the angled course of the minor cutting edge or edges results in a crowned shape. But a preferred embodiment of the present invention is also provided in that the angled course of the minor cutting edge or edges results in a bevel-like shape. In this way a considerable reduction of the noise emission is achieved not only by the reduction of the oscillation excitation of the tool and the workpiece, but also by a cutting division into a noise-optimized section with a large cutting volume and a quality-optimized section with a low cutting volume.

The angled course of the minor cutting edge, or respectively edges, can be realized in many ways, such as by a first linear inclined segment and a second linear segment which is parallel with the working plane; or in that the first linear inclined segment is formed on the minor cutting edge of the radially outer cutter teeth row and on the radially inner teeth row, and the second linear parallel section on the minor cutting edge of the radially inner cutter teeth row; or with respect to an unlimited radial line in its working plane, the minor cutting edge of the radially outer cutter teeth row has a positive inclination angle, and the minor cutting edge of the radially inner cutter teeth row has a negative inclination angle in the direction of rotation. Wherein in the latter case the radially outer cutter teeth row is equipped with pre-milling teeth, and the radially inner cutter teeth row with finishing milling teeth, wherein the larger portion of the rate of chip removal is provided by means of the radially outer cutter teeth row, and the smaller portion of the rate of chip removal by means of the radially inner cutter teeth row.

A further advantageous embodiment of a milling tool with a cutting division ensues when the radially outer cutter teeth row is provided with two to five times, preferably four times, the number of cutter teeth, compared with the number of cutter teeth of the radially inner cutter teeth row.

Advantageous embodiments of the cutting division of the milling tool ensue when the minor cutting edges are stepped in sections with different setting angles, or when the minor cutting edges are designed to be arched with respect to the working plane, or when the stepping of the setting angle takes place continuously or discontinuously, or when the extended length of the minor cutting edge length corresponds at least to two and a half times the entire working addition, or when a first tool element with the radially outer cutter teeth row, and a second tool element with the radially inner cutter teeth row is provided, and that the two tool elements can be placed axially against each other and can be connected in a manner fixed against relative rotation, or when the first tool element is designed to be collar-like, or when between sets of cutter teeth of the first tool element, which adjoin each other in the circumferential direction, free gaps have been provided for receiving a cutter tooth of the radially inner cutter tooth row arranged on the second tool element, wherein in the two latter cases a clear noise reduction results from the respective length.

Technical structural and manufacturing-related advantages result from the embodiments disclosed.

BRIEF DESCRIPTION OF THE DRAWINGS

Further details of the invention can be taken from the following description, wherein the present invention will be described and explained in more detail by means of the exemplary embodiments represented in the drawings. Shown are.

DETAILED DESCRIPTION OF THE PREFERRED EMBODIMENTS

Figure 1:
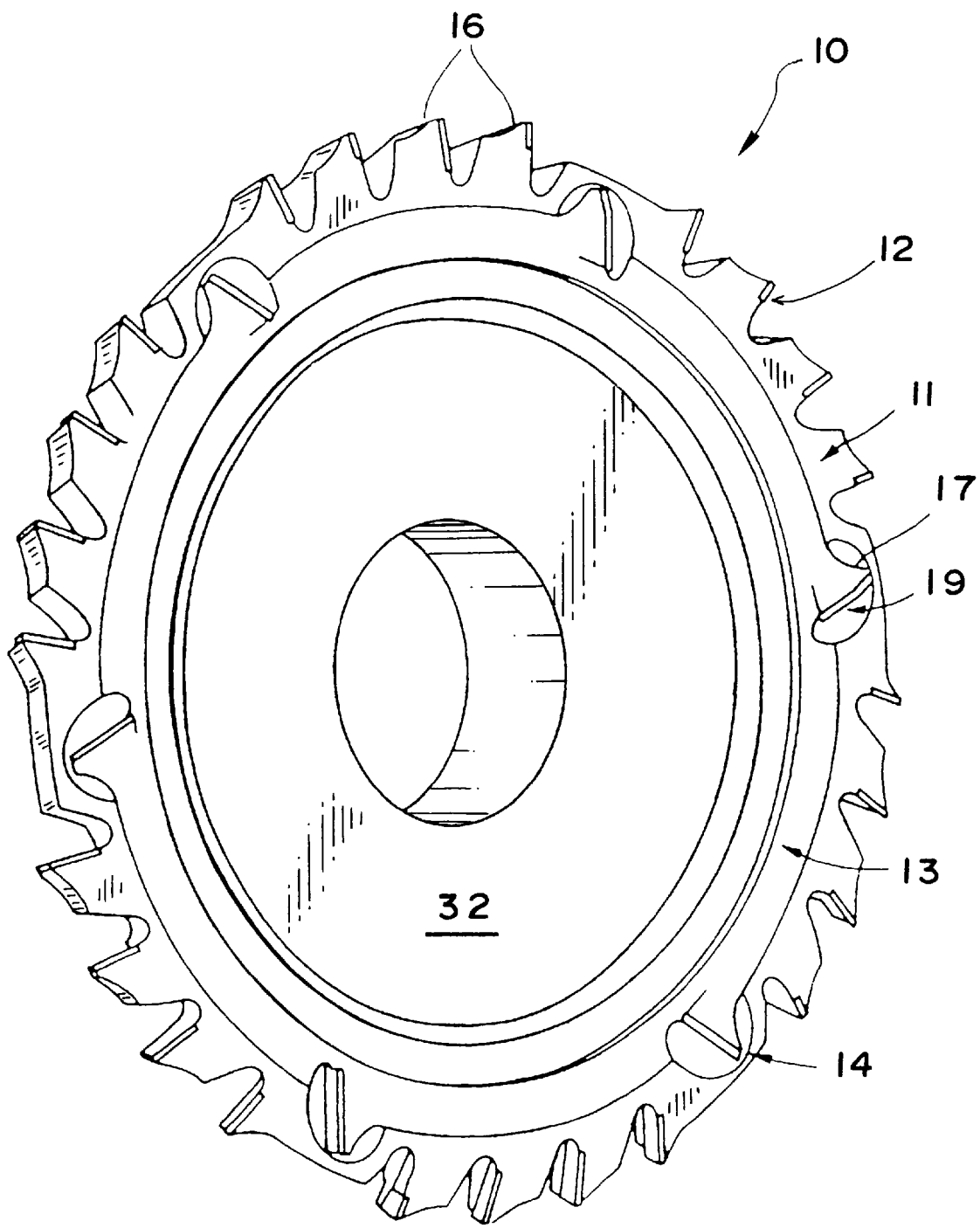
FIG. 1, which is a milling tool for front surface milling of a workpiece in a schematic perspective plan view, FIG. 2A, which is a partially cut perspective rear view of the one tool element of the milling tool in accordance with claim 1, provided with the outer row of cutter teeth, FIG. 2B, which is a partially broken rear view of the other tool element of the milling tool in accordance with claim 1, provided with the inner row of cutter teeth, FIG. 3A, which is a section along the line III—III of FIG. 1, FIG. 3B, which is a section corresponding to that of FIG. 3A, but in accordance with a variant, FIGS. 4A, B, which is front surface milling teeth in a front, or respectively lateral view of a milling tool in accordance with another exemplary embodiment of the present invention, FIG. 5, which is a graphic representation of the cutting force over the angle of attack in a comparison between a milling tool with a cutting tooth geometry in accordance with the invention and with a conventional cutting tooth geometry, FIGS. 6A, B, which are front surface milling teeth in a front, or respectively lateral view of a milling tool in accordance with a further exemplary embodiment of the present invention, FIGS. 7A, B, which are in a schematic front view, or respectively sectional view, the division of the cutting cross section into a large cutting cross section of the tool for noise-optimized pre-milling cutter teeth, and quality-optimized finishing milling cutter teeth with a small cross section in a milling tool similar to that in FIGS. 1 to 3, and FIGS. 8A, B, which are in a front view and partial lateral view, an arrangement of milling tools in accordance with the present invention during trimming by means of front surface milling.

The milling tool 10 in accordance with a preferred exemplary embodiment of the present invention represented in FIGS. 1 to 3 is used for working wood or similar easily machined materials, such as wood materials, plastic materials, laminated materials made of wood and plastic, and the like, and in this case for trimming plate-like components.

The milling tool 10 consists of a first tool element 11 with a radially exterior cutter teeth row 12 and a second tool element 13 with a radially interior cutter teeth row 14. The two tool elements 11 and 13 are connected with each other in a manner fixed against relative rotation. In the exemplary embodiment represented, the radially exterior cutter teeth row 12 at the exterior circumference of the first tool element 11 has considerably more, for example four times as many cutter teeth 16 than there are cutter teeth 17 of the radially interior cutter teeth row 14 at the exterior circumference of the second tool element 13. Here, the cutter teeth 16 on the first tool element 11 represent the so-called pre-milling teeth, and the cutter teeth 17 on the second tool element 13 represent the so-called finishing milling teeth.

The cutter teeth 16 of the radially outer cutter teeth row 12 of the first tool element 11 are arranged in sets, for example four cutter teeth 16 per set, around the circumference, wherein a gap 19 is provided between each set 18. The cutter teeth 16 arranged one behind the other on the circumference are alternatingly equipped with different small cutter teeth plates 21, or 22 respectively. The small cutter teeth plates 21, 22 constitute a major cutting edge 23, or 24 respectively on the circumference, which acts radially, and minor cutting edge teeth 25, or 26 respectively, which act axially. While with the small cutter teeth plates 21 a narrow major cutting edge 23 and a long minor cutting edge 25 are provided, the small cutter teeth plate 22 has a broad major cutting edge 24 and a short minor cutting edge 26. The broad major cutting edge 24 here takes up approximately the entire width of the cutter tooth 16, while the long minor cutting edge 25 takes up approximately the entire depth of the cutter tooth 16. The small cutter tooth plates 21, 22 are fastened, or respectively glued, in the customary manner to the cutter tooth body. The first tool element 11 is embodied to be circular and has a radially inwardly stepped cross section in the axial direction, as can be seen from FIG. 3.

Figure 2A:
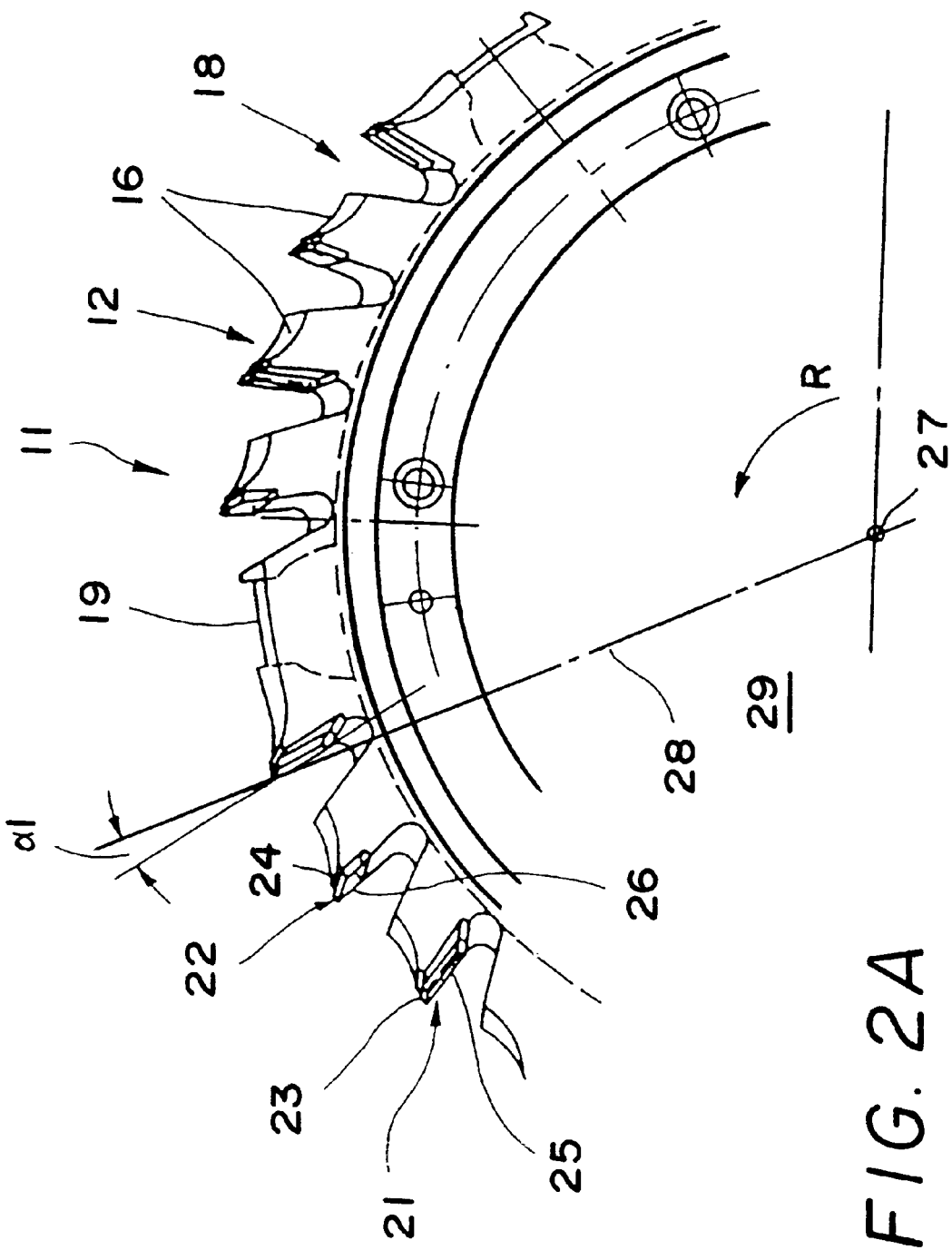
Figure 2B:
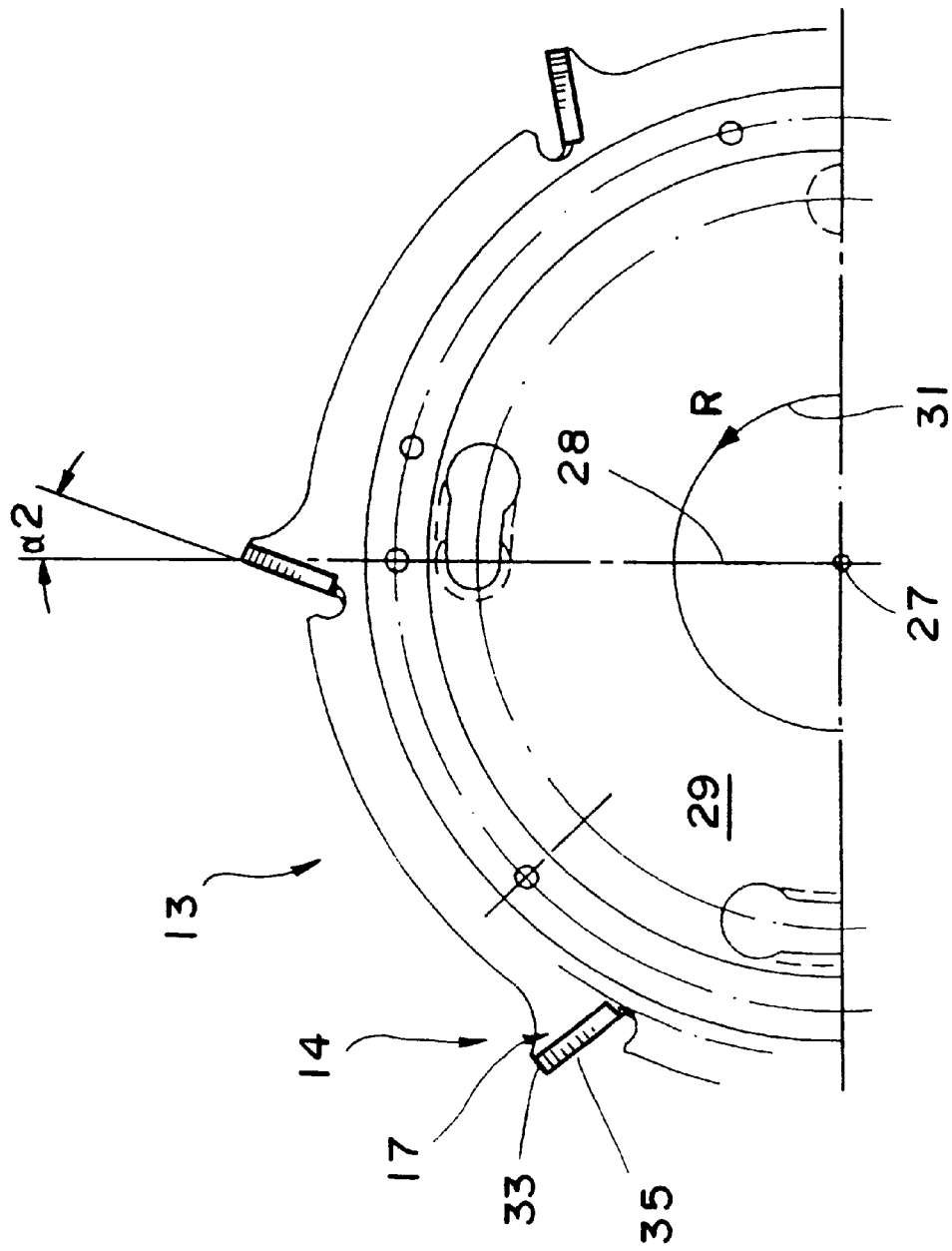

In accordance with FIG. 2B, the second tool element 13 is embodied to be disk-like and has a centered axial bore 31 for pushing the milling tool 10 on a driveshaft, not shown. The cutter teeth 17 are arranged evenly distributed over the exterior circumference of the second tool element 13 and they are received in the gaps 19 of the first tool element 11 in the assembled state of the two tool elements 11 and 13. Here, every gap 19 is embodied as a depression starting at the front, or working side 32 respectively. Viewed in cross section in accordance with FIG. 3, the outer circumferential side of the disk-shaped second tool element 13 is embodied to be stepped in such a way that the first tool element 11 is axially placed over the back 29 of the second tool element 13 and is connected with it, fixed against relative rotation, by means of pins 36 and/or screws. The cutter teeth 17 of the radially inner cutter teeth row 14 of the second tool element 13 have a major cutting edge 33 on the circumferential side, which acts radially, and a minor cutting edge 35 on the circumferential side, which acts axially.

As can be seen from FIGS. 2A and 2B in particular, the minor cutting edges 25 and 26, or respectively 35, of the cutter teeth 16, or respectively 17, have a different angle $\alpha 1$, or $\alpha 2$ respectively, with respect to an unlimited radial line 28 emanating from the axis of rotation 27 in the processing, or respectively working plane 32. While the minor cutting edge 25, or 26 respectively, of the cutter teeth 16 of the first tool element 11 has a positive angle of inclination $\alpha 1$ with respect to the imagined unlimited radial line 28, the minor cutting edge 35 of the cutter teeth 17 on the second tool element 13 is arranged at a negative angle of inclination $\alpha 2$ with respect to the unlimited radial line 28. In other words, the minor cutting edges 25 and 26 are arranged in a leading manner in the direction of rotation R with respect to the unlimited radial line 28, and the minor cutting edges 35 trailing with respect to the unlimited radial line.

Figures 3A, 3B:
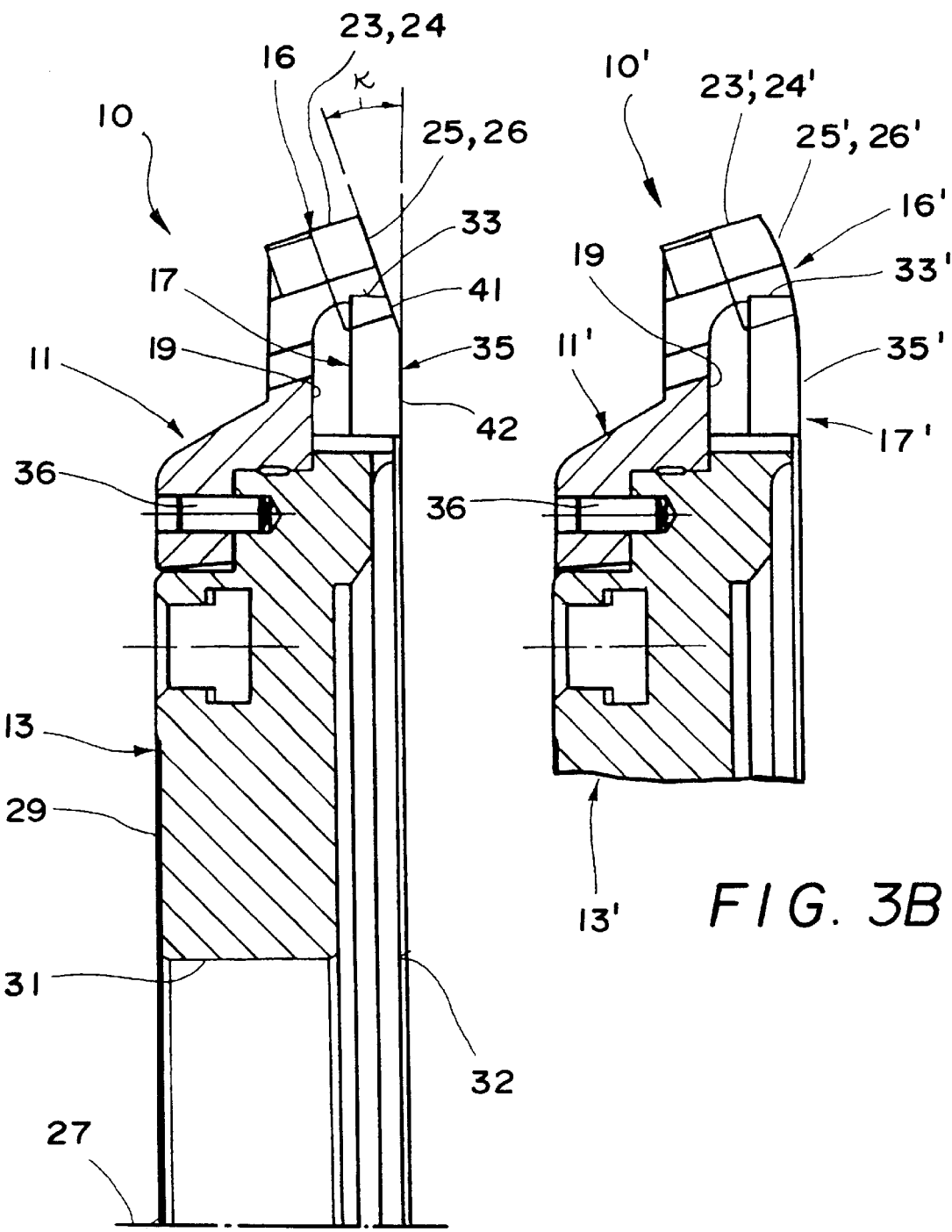

In accordance with the assembled sectional view of FIG. 3A, the minor cutting edges 25 and 26 of the outer cutter teeth row 11 are arranged at a defined inclination, or respectively setting angle kappa with respect to the working plane 32, which extends perpendicularly with respect to the axis of rotation 27. Here, the minor cutting edges 25 and 26 of the individual cutter teeth 16 are located aligned one behind the other, viewed in the circumferential direction. The minor cutting edge 35 of the cutter teeth 17 of the radially inner cutter teeth row 14 of the second tool element 13 has two cutting edge segments 41 and 42, of which the radially inner segment 42 lies parallel with the working plane 32, while the radially outer segment 41 is also arranged at the angle kappa with respect to the working plane 32 and in this case is aligned with the minor cutting edges 25 and 26. In other words, the minor cutting edges 25, 26 and 35 are arranged in such a way that they have, radially from the outside to the inside, a setting angle which can be measured in two stages (kappa=acute angle and kappa=0) with respect to the working plane 32.

In connection with a variant represented in FIG. 3B, the setting angle of the minor cutting edges 25, 26, or respectively 35, which decreases radially from the outside to radially toward the inside, is embodied in such a way that the minor cutting edges are designed in a bevel-like manner, i.e. with setting angles kappa decreasing in several sections until kappa=0, with respect to the working plane 32. It is understood that this can also take place in such a way that the progression of the lined-up minor cutting edges 25, 26 and 35 is not bevel-like, but crowned.

Figure 4:
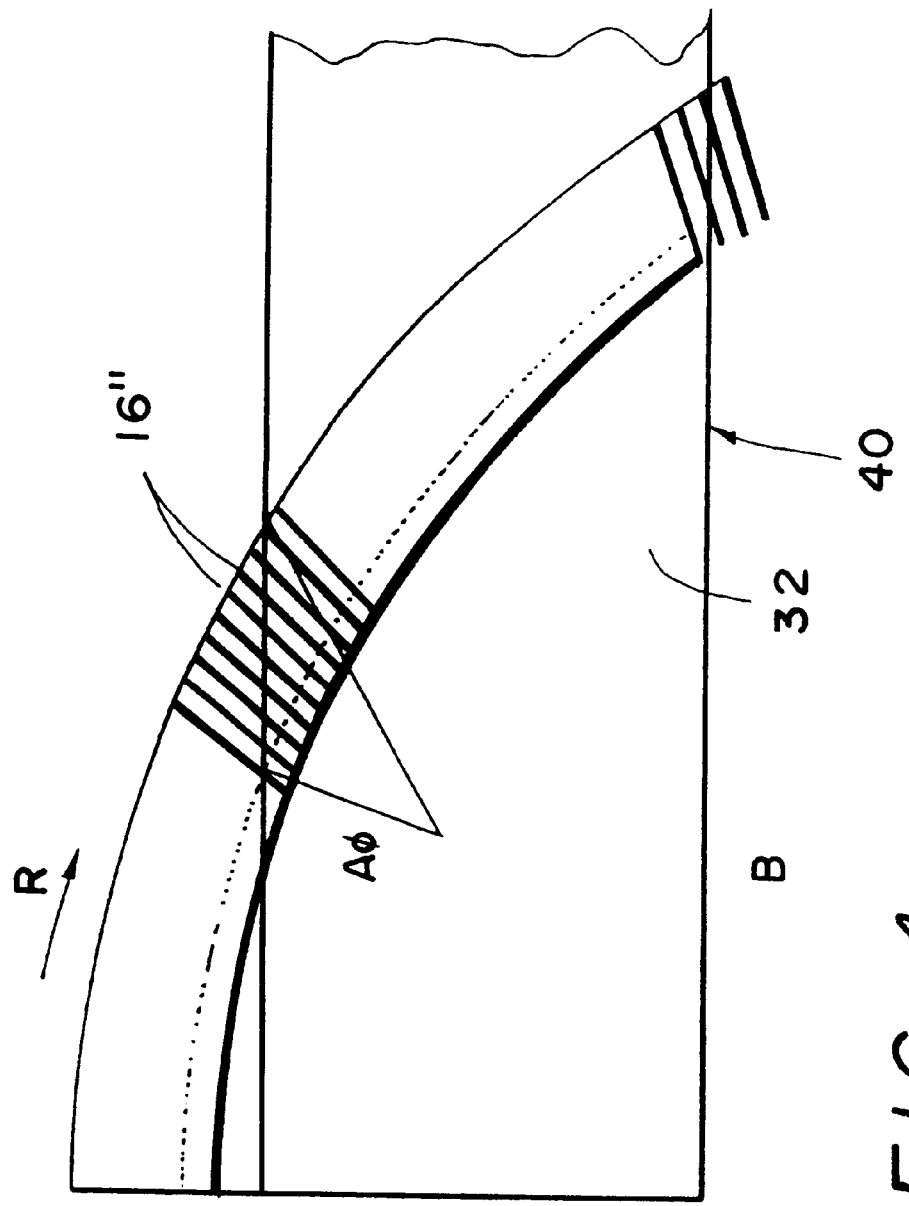
Figure 4:
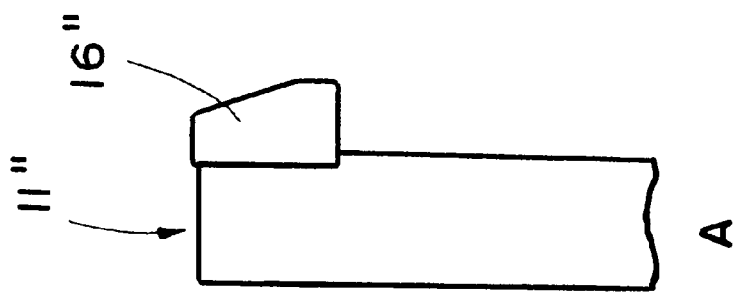
Figure 6:
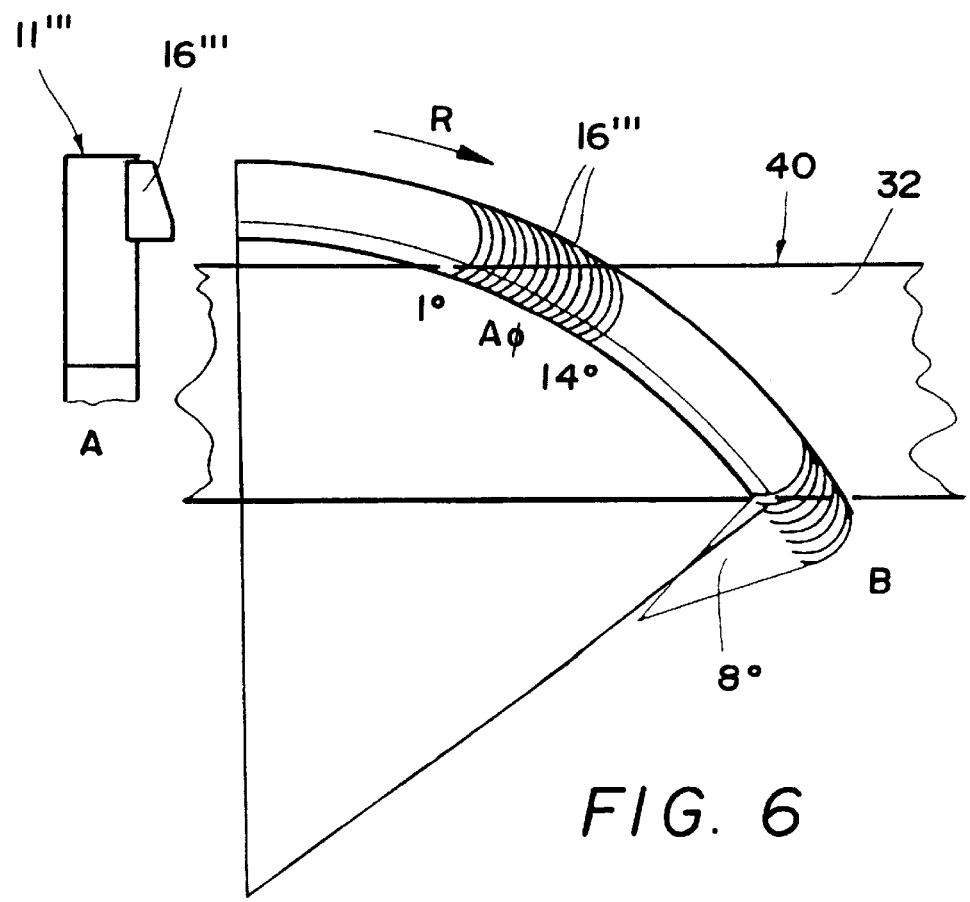

While, in connection with the milling tool 10 in accordance with FIGS. 1 to 3, the angular progression of the minor cutting edges is represented as the combination of the angular progression of a minor cutting edge 25, or 26 respectively, of an outer cutter teeth row 12, and a minor cutting edge 35 of an inner cutter teeth row 14 following in the direction of rotation, to provide this setting angle, which continuously or in sections decreases from radially outward to radially inward, at an individual minor cutting edge 25, 26 of an individual cutter tooth row 12 on an individual tool element 11", or respectively 11''', as can be seen by way of example from FIGS. 4 and 6. Here, in accordance with FIG. 4, the cutter teeth 16" are placed parallel with, or respectively in the working plane 32, while the cutter teeth 16''', and therefore the minor cutting edges in accordance with FIG. 6 extend curved, or respectively crowned, in relation to the working plane 32.

A directed cutting force-time function is possible by means of a variable setting angle kappa and a changeable cutting width b. The cutting width and the setting angle kappa must have different suitable values for different engagement angles in order to prevent an increase of the cutting force-time function. This is accomplished by a clear lengthening of the tooth and of a setting angle kappa, which can be changed by means of the length of the surface cutting edge of the tooth which is in engagement, along with a cutting width which is different as a function of the engagement angle. How it is possible to change the cutting force-time function in comparison with a customary sawtooth, or respectively front surface milling tooth geometry, is explained by means of further examples. In accordance with FIGS. 4A, B, with such a front surface milling tooth geometry the cutting process starts with the engagement of the surface cutting edge. Before the entire surface cutting edge is in engagement, it moves through a setting angle difference of $A\phi=8°$. The cutting force builds up in the time associated with this. But with a customary sawtooth geometry the build-up of the cutting force, for example at a tooth advance of $f_z=0.5$ mm, takes place within an engagement angle range of $A\phi=0.2°$. Therefore the increase of the cutting force $dF_c/dt$ is approximately forty times as high. In the selected example the cutting tooth has a length of 20 mm and tapers upward to a depth of 4 mm. It has three active individual cutting edges with the setting angles kappa=90° (major cutting edge length 4 mm);

kappa=5° (minor cutting edge length 16.5 mm); and kappa=0° (minor cutting edge length 3 mm).

Its maximum depth is 10 mm, the working addition 4 mm. The circumferential cutting edge, i.e. the major cutting edge where kappa=90°, does not come into engagement. The tooth advance ($f_z$) should be $f_z=1$ mm. A workpiece 40 of a thickness (d) d=50 mm is worked by means of a tool 11" of a diameter D=300 mm, with a projection (ü) of ü=20 mm. The cutting speed ($v_c$) should be approximately 40 m/s, the material would be particle board ($k_c=13.8+1.45/h_m$). The cutting edge length (b) in engagement, corresponding to the angular position respectively stepped at a distance of 1°, can be seen in FIG. 4B.

Figure 5:
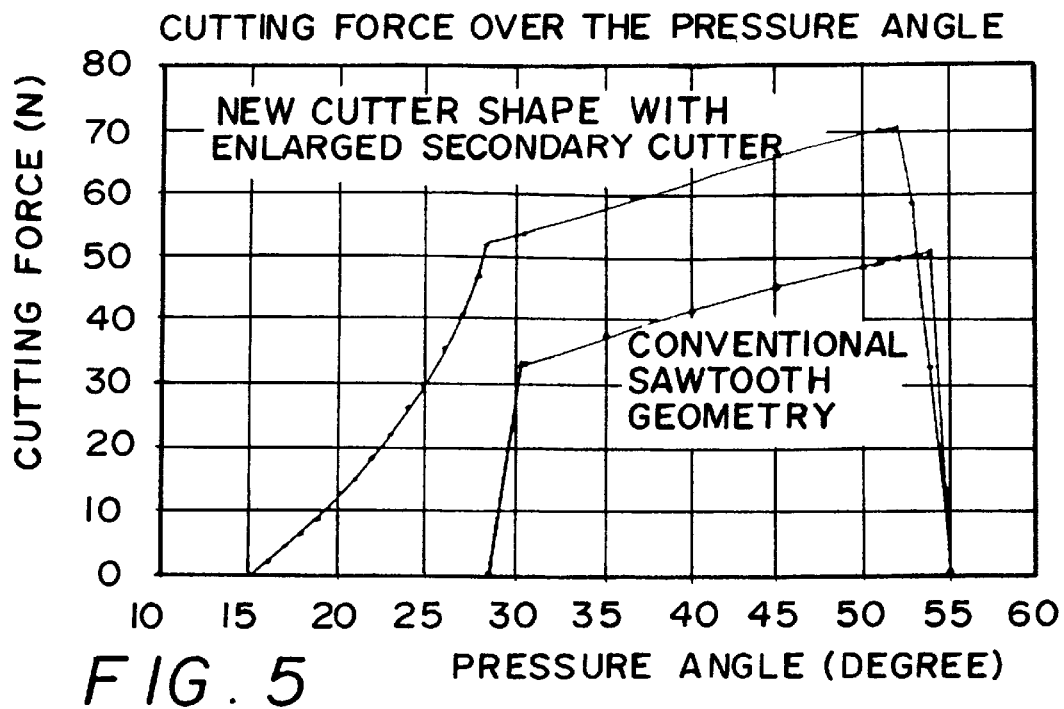

The chronological delay of the cutting force impulse by the lengthening of the minor cutting edge by means of different setting angles is represented in the diagram (FIG. 5).

While, with a tooth geometry with a lengthened minor cutting edge, the engagement length reaches its maximal value within an angle of rotation range of 8°, this already takes place during circular sawing with opposite running in an angular range of 0.2°, in ganging for all practical purposes within an infinitely small amount of time. By means of the special cutting edge geometry it is possible to affect the progress of the cutting force over time in such a way that, because of a flat increase and decrease, an oscillation reduction, and therefore a clear noise reduction can be achieved. In accordance with FIG. 5 the decrease of the cutting force cannot be affected as strongly as the increase.

However, if the cutter elements 16''' are designed circularly, curved or spiral-shaped with respect to the working plane 32, it is possible as represented in FIGS. 6A, B, to further slow both the increase and the decrease of the cutting force over time. Curved cutter elements 16''' are represented in FIGS. 6A, B, from the start of the cutting process in steps of respectively one degree. In comparison with FIGS. 4A, B, the increase of the cutting force is extended to an engagement angle range $S\phi$ from 8° to 14°, and the decrease from approximately 2° to 8°.

Figure 7:
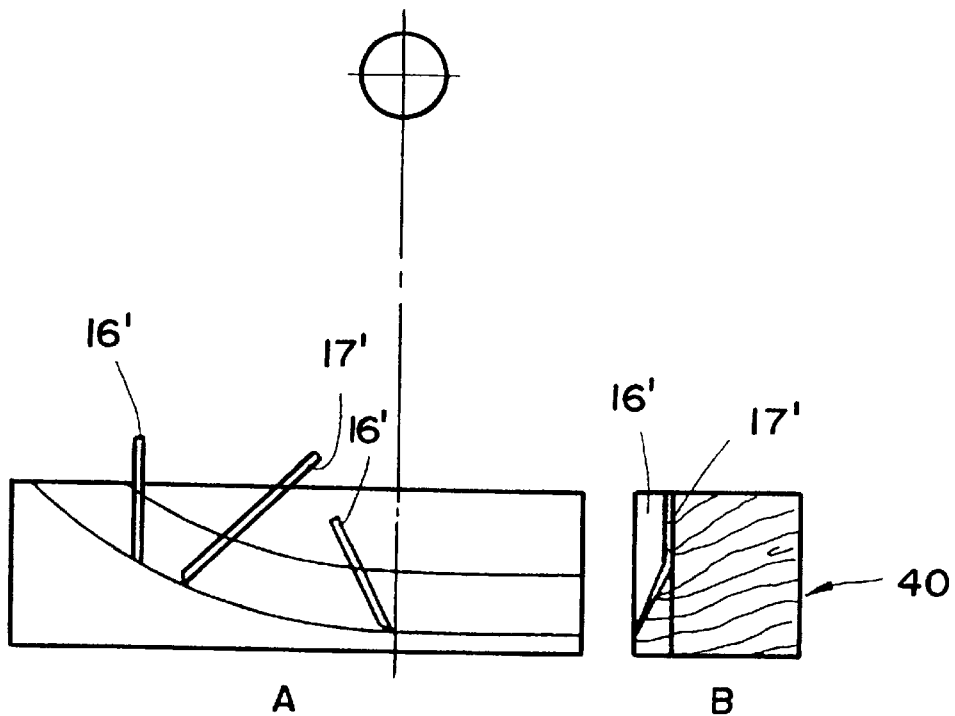

As mentioned, a further noise-reducing effect can be achieved if, in accordance with the first exemplary embodiment of FIGS. 1 to 3, two or more cutter teeth rows 12, 14, which are offset in their working plane, are employed and therefore a cutting division takes place (FIG. 7). Here, the largest portion of the cutting volume is removed from the workpiece 40 by means of a noise-optimized cutter teeth geometry (pre-milling teeth 16'), and only a small fraction for the finished achievement of the processing quality by means of a quality-optimized cutter teeth geometry (finishing milling teeth 17'). In this case these pre-milling teeth 16' need only create a sufficient processing quality. The noise emission is a function of the rate of chip removal, i.e. the less the addition for processing, the less noise is emitted. By halving the rate of chip removal, the noise level falls by approximately 3 dB. At a distance between levels of 6 dB (i.e. at a quarter of the material cut in a unit of time), the loudest sound source, in the special case the noise-optimized pre-milling teeth 16', determine the total sound pressure level. The cutter teeth row which creates the final processing quality with its finishing milling teeth 17', only cuts a small rate of chip removal and therefore generates a negligible sound pressure level.

Figure 8:
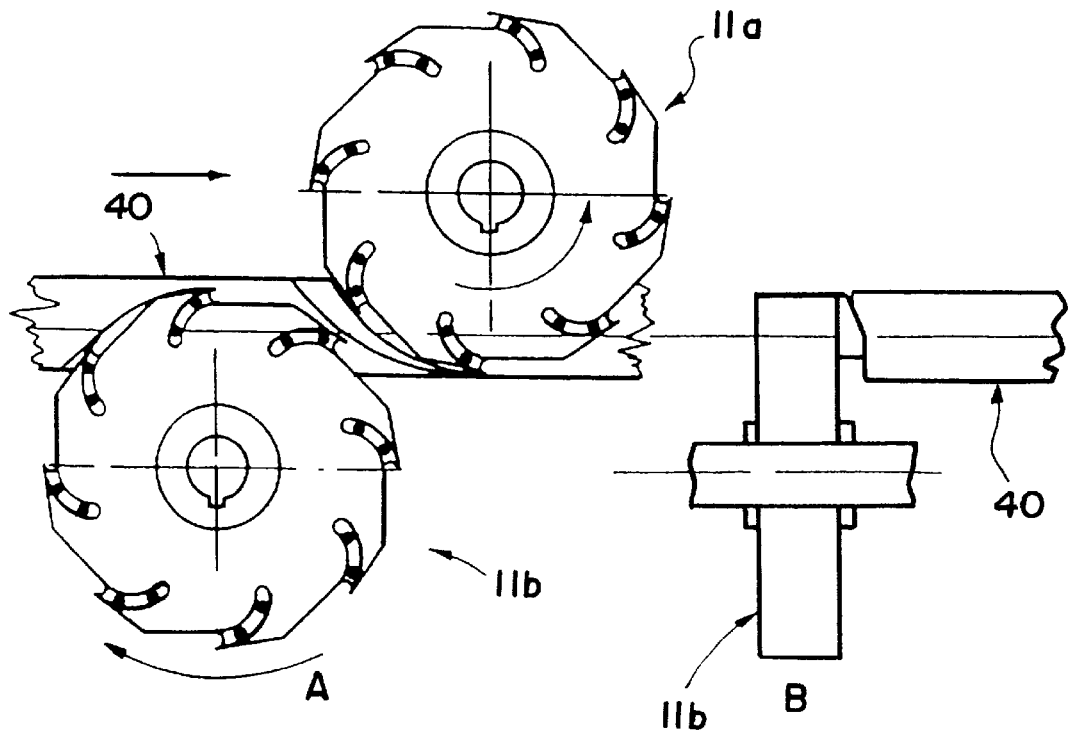

When trimming by means of front surface milling devices, two oppositely located tools 11a and 11b operate by ganging (FIG. 8). The chip is cut from its strongest side, i.e. the cutting force-time progression corresponds to the ganging. In ganging, the largest unsteadiness occurs at the start of the cutting process. With the depth of cut becoming less, the cutting force also becomes less, and at the end of the cutting process the unsteadiness resulting from the excitation force is considerably less. It is therefore mainly important in connection with trimming by means of ganged front surface milling to reduce the increase of the excitation force at the start of cutting.

It is claimed:

1. A milling cutter having a front surface, a working plane and a circumferential surface, and defining an axis of rotation, comprising:

at least one row of cutter teeth extending about the circumferential surface, said cutter teeth serving for pre-milling; and a row of teeth for finishing milling situated on the front surface, wherein:

the teeth of both rows have radially cutting edges and axially cutting minor cutting edges, said minor cutting edges define rotary surfaces which make a transition into each other such that the combined rotary surface forms a setting angle which are reduced according to one of: continuously and in sections, from being oriented radially outward to radially inward with respect to the working plane, the working plane extending perpendicularly to the axis of rotation.

2. The milling tool according to claim 1, wherein the angled course of said minor cutting edges results in a crowned shape.

3. The milling tool according to claim 1, wherein the angled course of said minor cutting edges results in a bevel-like shape.

4. The milling tool according to claim 1, wherein the angled course of said minor cutting edges results from a first linear inclined segment and a second linear segment which is parallel with said working plane.

5. The milling tool according to claim 4, wherein said first linear inclined segment is formed on said minor cutting edges of said at least one row of cutter teeth and said row of teeth for finishing milling, and wherein said second linear parallel section is formed on said minor cutting edges of said row of teeth for finishing milling.

6. The milling tool according to claim 4, wherein relative to a radial line in said working plane, said minor cutting edges of said at least one row of cutter teeth have a positive inclination angle and said minor cutting edges of said row of teeth for finishing milling have a negative inclination angle in the direction of rotation.

7. The milling tool according to claim 1, wherein the cutter teeth row of said at least one row of cutter teeth extending about the circumferential surface includes pre-milling teeth, and cutter teeth of said row of teeth for finishing milling includes finishing milling teeth, and wherein the larger portion of the rate of chip removal is provided by means of said at least one row of cutter teeth extending about the circumferential surface, and the smaller portion of the rate of chip removal is provided by means of said row of teeth for finishing milling.

8. The milling tool according to claim 1, wherein said at least one row of cutter teeth extending about the circumferential surface is provided with 2 to 5 times the number of cutter teeth, compared with the number of teeth of said row of teeth for finishing milling.

9. The milling tool according to claim 1, wherein said minor cutting edges are stepped in sections with different setting angles.

10. The milling tool according to claim 1, wherein said minor cutting edges are arched with respect to said working plane.

11. The milling tool according to claim 1, wherein said minor cutting edges are stepped in sections with different setting angles and wherein the stepping of said setting angle occurs according to one of: continuous and discontinuous manner.

12. The milling tool according to claim 1, wherein the extended length of said minor cutting edge length corresponds to at least two and a half times the entire working addition.

13. The milling tool according to claim 1, further comprising:

a first and second tool element for said at least one row of cutter teeth and said row of teeth for finishing milling, respectively, wherein said first and second tool element are placed axially each other, and are connected in a manner fixed against relative rotation.

14. The milling tool according to claim 13, wherein said first tool element is collar-like.

15. The milling tool according to claim 13, wherein free gaps are provided between sets of cutter teeth of said first tool element, which adjoin each other in the circumferential direction, which receive cutter teeth arranged on said second tool element.

16. The milling tool according to claim 1, wherein the cutter teeth of said at least one row of cutter teeth extending about the circumferential surface are alternately provided with one of: a wider cutting edge, a narrower cutting edge, a shorter cutting edge and a longer cutting edge.

* * * * *